US007623457B2

United States Patent
Hu

(10) Patent No.: US 7,623,457 B2
(45) Date of Patent: Nov. 24, 2009

(54) METHOD AND APPARATUS FOR MANAGING END-TO-END QUALITY OF SERVICE POLICIES IN A COMMUNICATION SYSTEM

(75) Inventor: Cheng-Hong Hu, San Ramon, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 619 days.

(21) Appl. No.: 11/095,631

(22) Filed: Mar. 31, 2005

(65) Prior Publication Data
US 2006/0221830 A1    Oct. 5, 2006

(51) Int. Cl.
*H04J 3/14*    (2006.01)
(52) U.S. Cl. .................................. 370/235; 370/395.21
(58) Field of Classification Search .................. 370/229, 370/230, 235, 395.2–395.51, 412, 413, 466, 370/469
See application file for complete search history.

(56) References Cited

U.S. PATENT DOCUMENTS

| 5,737,315 | A  * | 4/1998 | Moritomo ..................... 370/235 |
| 6,795,445 | B1 * | 9/2004 | Kabie et al. ................... 370/401 |
| 7,197,048 | B1 * | 3/2007 | Duffield et al. ............. 370/468 |
| 2001/0053149 | A1 * | 12/2001 | Mo et al. ..................... 370/389 |
| 2002/0114274 | A1 * | 8/2002 | Sturges et al. ................ 370/229 |
| 2003/0012137 | A1 * | 1/2003 | Abdelilah et al. ........... 370/229 |
| 2003/0048792 | A1 | 3/2003 | Xu et al. |
| 2003/0053464 | A1 | 3/2003 | Chen et al. |
| 2004/0037296 | A1 | 2/2004 | Kim et al. |
| 2004/0141491 | A1 | 7/2004 | Takei et al. |
| 2004/0160956 | A1 | 8/2004 | Hardy et al. |
| 2005/0002333 | A1 | 1/2005 | Aalders et al. |
| 2006/0092833 | A1 * | 5/2006 | Bemmel et al. ............. 370/229 |
| 2006/0092931 | A1 * | 5/2006 | Walter et al. ................ 370/389 |

* cited by examiner

*Primary Examiner*—Chirag G Shah
*Assistant Examiner*—Daniel Mitchell
(74) *Attorney, Agent, or Firm*—Ed Guntin; Pablo Meles; Akerman Senterfitt

(57) ABSTRACT

A computer-readable storage medium (102) is provided for managing end-to-end QoS (Quality of Service) policies in a communication network (100). The storage medium includes computer instructions for establishing (302) a plurality of QoS domains (108) between a plurality of packet switching technologies (102, 106, 110) operating with disparate QoS policies, each QoS domain having an ingress and egress boundary, remapping (303) a QoS policy of each packet exchanged between the ingress boundaries of the plurality of QoS domains, and restoring (309) the QoS policy of each packet exchanged between the egress boundaries of the plurality of QoS domains.

17 Claims, 4 Drawing Sheets

METHOD AND APPARATUS FOR MANAGING END-TO-END QUALITY OF SERVICE POLICIES IN A COMMUNICATION SYSTEM

FIELD OF THE INVENTION

This invention relates generally to packet switching technologies, and more particularly to a method and apparatus for managing end-to-end QoS (Quality of Service) policies in a communication system.

BACKGROUND OF THE INVENTION

It is common for Internet service providers to have hybrid IP (Internet Protocol) communication networks that include legacy packet switching technologies operating with disparate QoS policies. A need therefore arises for a method and apparatus for managing end-to-end QoS (Quality of Service) policies in a communication system.

SUMMARY OF THE INVENTION

Embodiments in accordance with the invention provide a method and apparatus for managing end-to-end QoS (Quality of Service) policies in a communication system.

In a first embodiment of the present invention, a computer-readable storage medium is provided for managing end-to-end QoS (Quality of Service) policies in a communication network. The storage medium includes computer instructions for establishing a plurality of QoS domains between a plurality of packet switching technologies operating with disparate QoS policies, each QoS domain having an ingress and egress boundary, remapping a QoS policy of each packet exchanged between the ingress boundaries of the plurality of QoS domains, and restoring the QoS policy of each packet exchanged between the egress boundaries of the plurality of QoS domains. The computer-readable storage medium can be a hard drive, ROM, RAM or other memory storage, but excludes intangible transitory media such as carrier signals.

In a second embodiment of the present invention, a provider edge manages end-to-end QoS (Quality of Service) policies in a communication network. The provider edge includes a packet router, and a processor for controlling operations of the packet router. The processor is programmed to establish a plurality of QoS domains between a plurality of packet switching technologies operating with disparate QoS policies, each QoS domain having an ingress and egress boundary, remap a QoS policy of each packet exchanged between the ingress boundaries of the plurality of QoS domains, and restore the QoS policy of each packet exchanged between the egress boundaries of the plurality of QoS domains.

In a third embodiment of the present invention, a method is provided for managing end-to-end QoS (Quality of Service) policies. The method includes the steps of establishing a plurality of QoS domains between a plurality of packet switching technologies operating with disparate QoS policies, each QoS domain having an ingress and egress boundary, remapping a QoS policy of each packet exchanged between the ingress boundaries of the plurality of QoS domains, and restoring the QoS policy of each packet exchanged between the egress boundaries of the plurality of QoS domains.

DETAILED DESCRIPTION OF THE DRAWINGS

Figure 1:
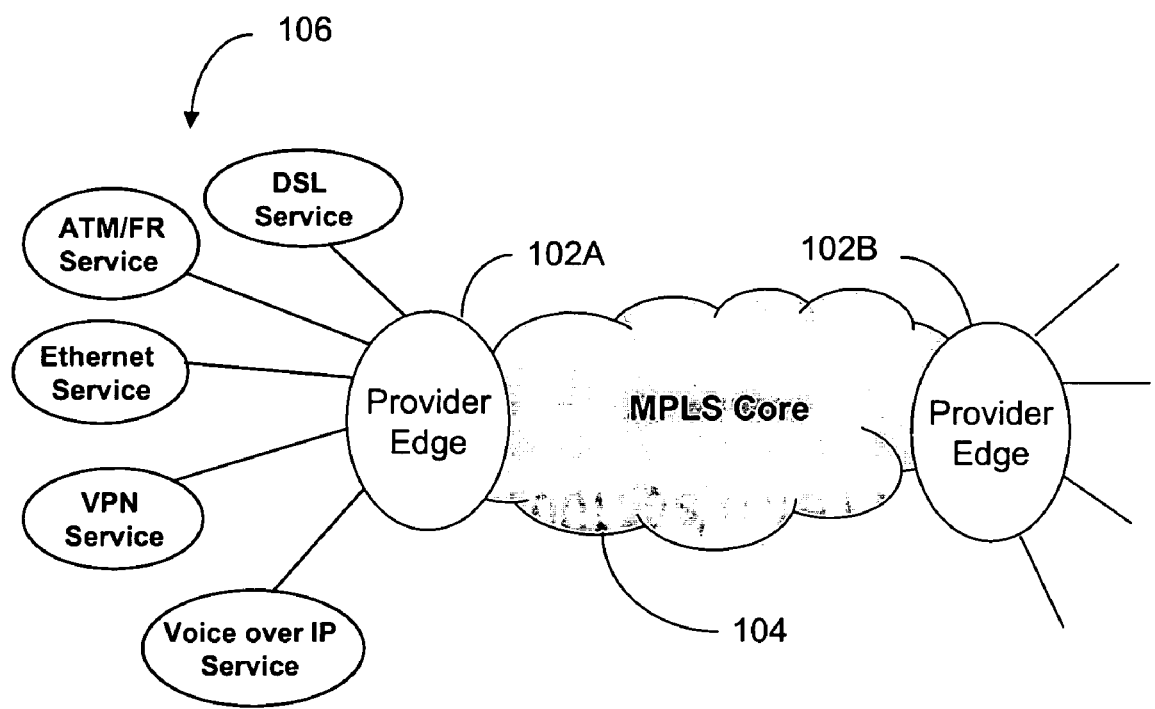
FIGS. 1-2 are block diagrams of a communication network according to an embodiment of the present invention.

While the specification concludes with claims defining the features of embodiments of the invention that are regarded as novel, it is believed that the embodiments of the invention will be better understood from a consideration of the following description in conjunction with the figures, in which like reference numerals are carried forward.

Figure 2:
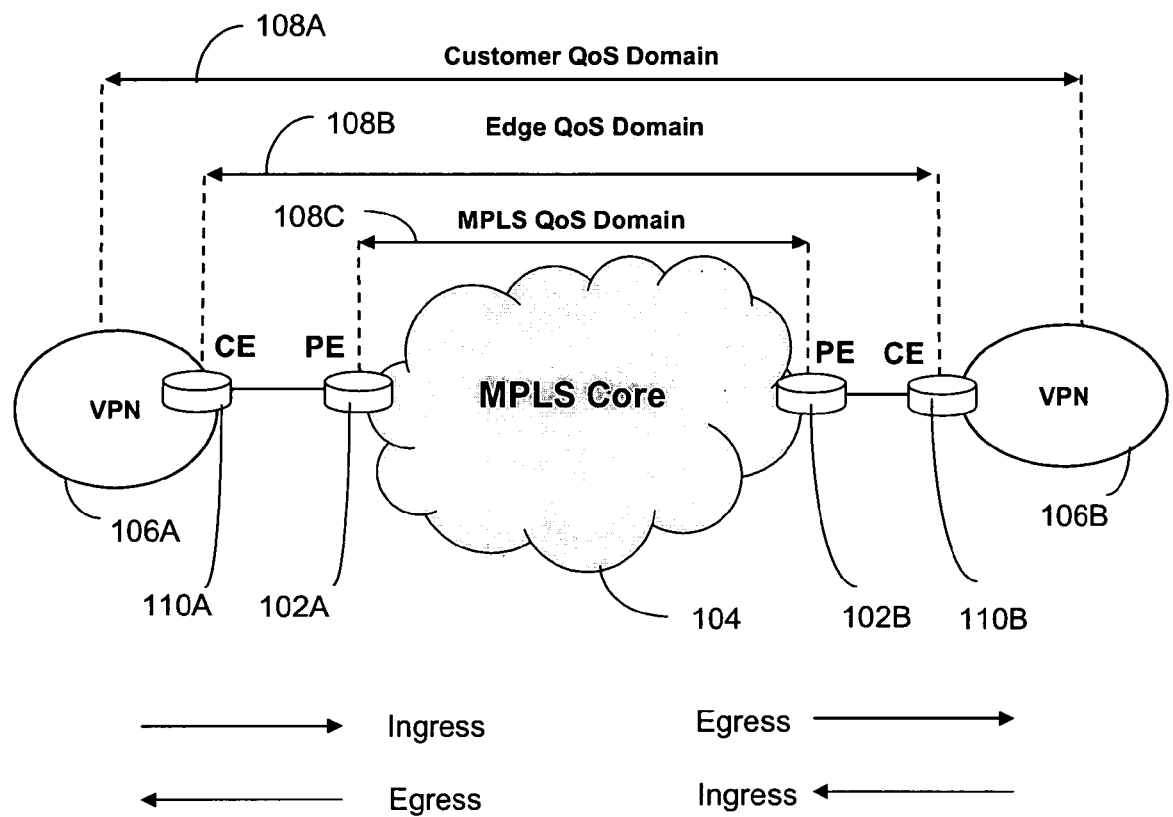

FIGS. 1-2 depict block diagrams of a communication network 100 according to an embodiment of the present invention. The communication network 100 comprises a plurality of packet switching technologies conforming to a MultiProtocol Label Switching (MPLS) standard defined by the Internet Engineering Task Force (IETF—see www.ietf.org). All present and future references to the MPLS standard by the IETF organization or related organizations is included by reference herein.

The foregoing packet switching technologies are represented by an MPLS core 104 coupled in part to at least one among a group of Internet switching services 106 including, but not limited to, an Asynchronous Transfer Mode Frame Relay (ATMFR), a Virtual Private Network (VPN), a Voice over Internet Protocol (VoIP), a Digital Subscriber Line (DSL), and Ethernet. Each of these services 106 interfaces to the MPLS core 104 through a Provider Edge (PE) 102. The PE 102 comprises a conventional packet router and a conventional processor including one or more conventional processing technologies such as microprocessors and/or DSPs (Digital Signal Processors) for processing packets according to the present invention. As packets flow end-to-end bidirectionally in the network 100, the PE 102 serves both as an ingress and egress packet router between QoS domains as will be explained shortly.

FIG. 2 illustrates an example of an end-to-end VPN service according to an embodiment of the present invention. According to FIG. 2, the network 100 of packet switching devices is subdivided into three QoS domains: a customer QoS domain 108A, an Edge QoS domain 108B, and an MPLS QoS domain 108C. Because of the hybrid nature of the switching technologies and/or services of the network 100, each domain has its own QoS policies.

Figure 5:
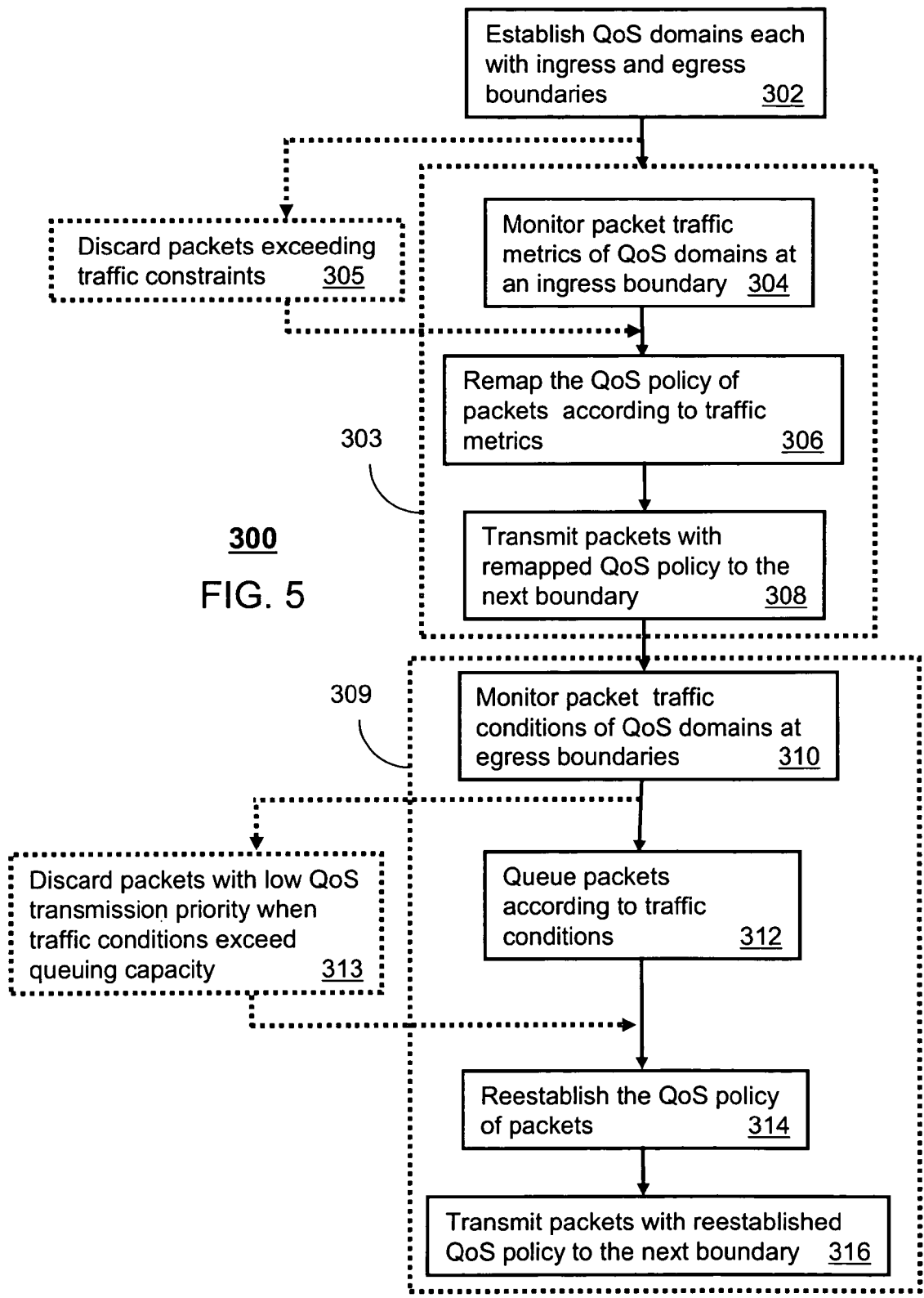
FIG. 5 depicts a flow chart of a method operating in the communication network according to an embodiment of the present invention.

To better understand the operation of the communication network of FIGS. 1-2, the reader's attention is directed to FIG. 5, which depicts a flow chart of a method 300 operating in said communication network 100 according to an embodiment of the present invention. Method 300 provides an approach for managing end-to-end QoS policies between VPN 106A-B services. Method 300 begins with establishing in step 302 QoS domains 108A-C between packet switching technologies operating with disparate QoS policies as illustrated earlier in FIG. 2. Each QoS domain 108A-C has an ingress and egress boundary as shown by the vertical dashed lines. In step 303, the QoS policy of each packet exchanged between the ingress boundaries of the QoS domains is remapped. Referring back to FIG. 2, the customer QoS domain 108A (having its own QoS policy) is remapped between a Customer Edge (CE) router 110A and a PE 102A with the QoS policies defined by the edge QoS domain 108B. Similarly, the QoS policies defined by the edge QoS domain 108B is remapped by the PE 102A to conform to the QoS policies of the MPLS QoS domain 108C.

Figure 3:
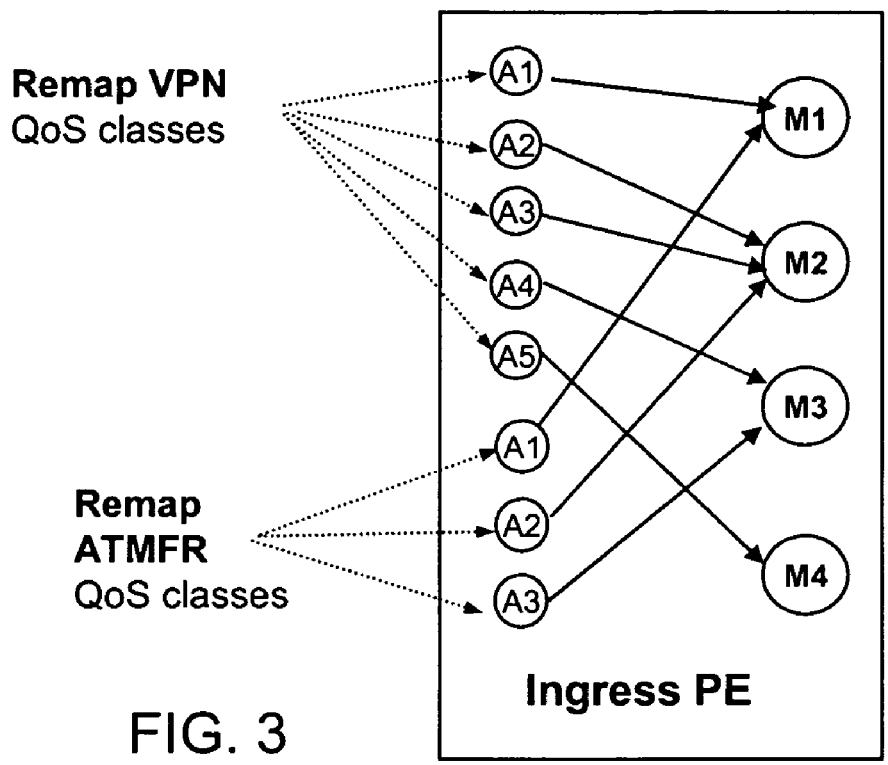
FIGS. 3-4 depict mapping schemes for QoS policies of QoS domains at ingress and egress boundaries of the provider's network according to an embodiment of the present invention.
Figure 4:
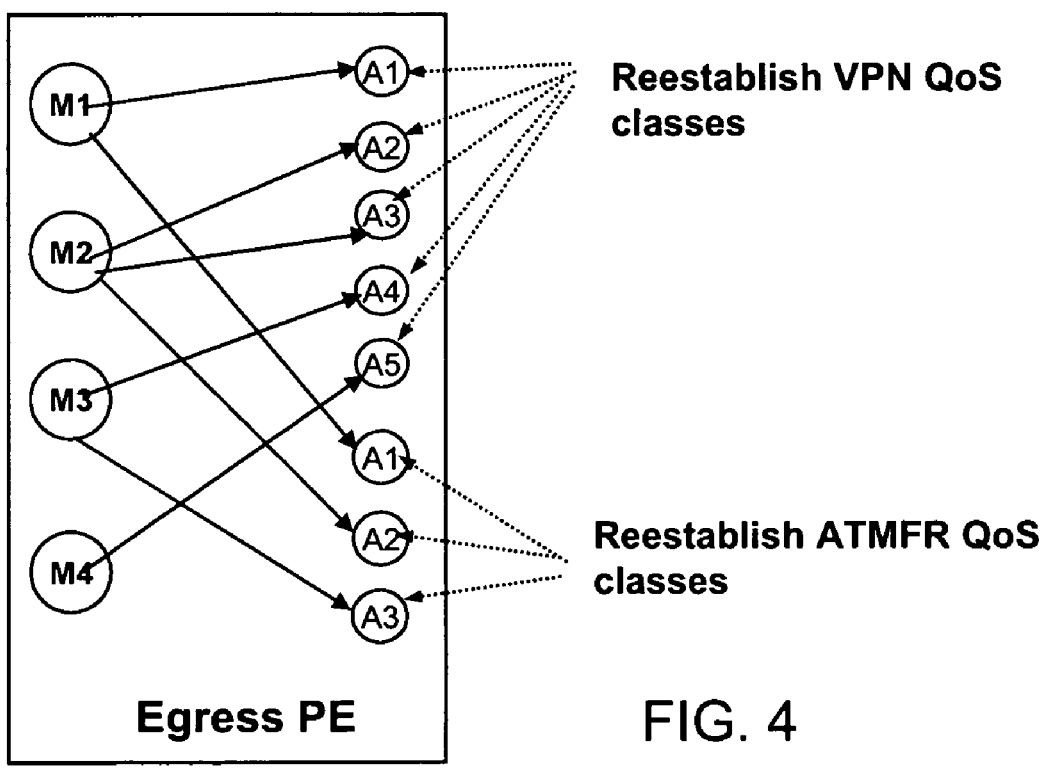

FIGS. 3-4 depict mapping schemes for QoS policies of QoS domains at ingress and egress boundaries of the provider's network according to an embodiment of the present invention. In the present illustration, VPN and ATMFR services have their own QoS classes which are not necessarily consistent with the QoS classes of the MPLS core 104. To provide a manageable end-to-end QoS policy, the VPN and ATMFR classes are remapped to a new set of QoS defined in the MPLS core. The mapping scheme between these services and the MPLS core 102 can be defined in a Service Level Agreement (SLA) executed between a customer and the service provider managing portions of the network 100. For example, based on an agreed upon SLA, the ingress PE 102A maps VPN QoS class A1 to MPLS QoS class M1, VPN QoS class A2 and A3 are mapped to MPLS QoS class M2, and so on. Similarly, the ingress PE 102A maps ATMFR QoS class A1 to MPLS QoS class M1, ATMFR QoS class A2 is mapped to MPLS QoS class M2, and so on.

MPLS QoS class M1 can, for example, be reserved for the highest priority traffic such as real-time packet traffic (e.g., VoIP). MPLS QoS class M2 can be used for high priority burst traffic, while MPLS QoS class M3 can be used for medium priority burst traffic. Lastly, MPLS QoS class M4 can be used for low priority traffic. Depending on the traffic constraints defined by the SLA, the VPN and ATMFR QoS classes can be mapped differently between customers of the service provider. Accordingly, a service provider can charge customers on the basis of the QoS priority given to customer packet traffic.

The MPLS QoS classes (M1-M4) can be defined from a three bit EXP field of the MPLS standard for supporting Differentiated Services as defined by the IETF. All present and future modifications of the MPLS standard by the IETF organization or related organizations is included by reference herein. Referring back to FIG. 5, the remapping step 303 can be represented by the combination of steps 304-308. In step 304, the ingress PE 102A monitors traffic metrics of packets flowing therethrough. The traffic metrics include, but are not limited to, the QoS policy received with each packet, traffic conditions at the PE 102A, and the SLA packet traffic constraints for QoS domains agreed to between the service provider and the customer of the VPN 106A at said ingress boundary.

In step 306, the QoS policy for each of the received packets is remapped according to said traffic metrics similar to what was described in FIGS. 3-4. Said packets are then transmitted in step 308 to a downstream ingress domain like MPLS QoS domain 108C. In a supplemental embodiment, step 306 further includes the step of lowering a transmission priority of the QoS policy of a packet when traffic conditions are above average and below peak traffic conditions established by the SLA. The foregoing embodiments for the MPLS QoS domain 108C can be user defined in the EXP bits of the MPLS standard. For example, the following table can be used for defining classes M1-M4 and subclasses thereof.

| MPLS QoS Classes | MPLS EXP BITs |
|---|---|
| Real Time Class | 101 (M1) |
| High Data Class | 100 (M2-A) |
| (Burst traffic) | 011 (M2-B Reserved for exceeding traffic) |

-continued

| MPLS QoS Classes | MPLS EXP BITs |
|---|---|
| Medium Data Class | 010 (M3-A) |
| (Burst Traffic) | 001 (M3-B Reserved for exceeding traffic |
| Low Data Class | 000 (M4) |

According to the above classifications, class M2 and M3 have subclasses (M2-B and M3-B) which can be used for lowering the transmission priority of the QoS policy of packets when packet traffic is above average and below peak conditions set by the SLA. The lower priority settings can play a role in QoS policy management of a QoS domain at an egress boundary as will be discussed shortly. In yet another embodiment, the PE 102A can be further programmed in step 305 to discard packets if traffic conditions exceed the SLA packet traffic constraints agreed to with the customer of VPN 106A.

Thus, if the SLA defines, for example, a peak traffic limit and a customer's domain is exceeding this limit, the PE 102 can be programmed to discard packets until such time traffic conditions subside within the SLA limits. It will be appreciated by an artisan with skill in the art that less drastic measures can be used for managing packet traffic such as discarding packets only when the queuing capacity of a PE 102 is exceeded by multiple traffic flows. Accordingly, said modifications and/or additions to the above embodiments are intended to be within the scope and spirit of the claims described herein.

At the far end of the MPLS QoS domain, in step 309 the QoS policy of each packet exchanged between the egress boundaries of QoS domains is restored to the QoS policy before executing the remapping step 303. This step can be accomplished by the combination of steps 310-316. In step 310, traffic conditions of packets received from one or more QoS domains at an egress boundary are monitored. In the illustration of FIG. 2, the PE 102B would be the first egress boundary of the QoS domains. Accordingly, the packets received would be marked according to the MPLS QoS domain 108C (as described above). In step 312, the PE 102B queues these packets according to the traffic it has monitored.

In a supplemental embodiment, PE 102B discard in step 313 packets with low QoS transmission priority (as described in the above table) when traffic conditions exceed queuing capacity of the PE 102B. Once the packets have been queued, in step 314 the QoS policy of each packet is restored according to the QoS policy prior to the remapping step 303 (see FIG. 4 for an illustration). Once the QoS policy has been restored, the packets are transmitted to downstream egress boundaries of the QoS domains in step 316 (i.e., the edge QoS domain 108B followed by the customer QoS domain 108A). The PE 102A-B and CE 110A-B devices of FIG. 2 are mirror-imaged as packets flow end-to-end in the network 100. Accordingly, the PE 102A-B and CE 110A-B remap or restore QoS policies on the basis of traffic flow (see the arrows egress and ingress arrows of FIG. 2).

It should be evident by now that the present invention can be realized in hardware, software, or a combination of hardware and software. Moreover, the present invention can be realized in a centralized fashion, or in a distributed fashion where different elements are spread across several interconnected processors. Any kind of computer device or other apparatus adapted for carrying out method 300 described above is suitable for the present invention.

Additionally, the present invention can be embedded in a computer program product, which comprises all the features enabling the implementation of method 300, and which when loaded in a computer system is able to carry out these methods as computer instructions. A computer program in the present context means any expression, in any language, code or notation, of a set of instructions intended to cause a system having an information processing capability to perform a particular function either directly or after either or both of the following: a) conversion to another language, code or notation; b) reproduction in a different material form. It should be also evident that the present invention may be used for many applications. Thus, although the description is made for particular arrangements and methods, the intent and concept of the invention is suitable and applicable to other arrangements and applications not described herein. From the innumerable embodiments possible, it would be clear therefore to those skilled in the art that modifications to the disclosed embodiments described herein can be effected without departing from the spirit and scope of the invention.

Accordingly, the described embodiments ought to be construed to be merely illustrative of some of the more prominent features and applications of the invention. It should also be understood that the claims are intended to cover the structures described herein as performing the recited function and not only structural equivalents. Therefore, equivalent structures that read on the description should also be construed to be inclusive of the scope of the invention as defined in the following claims. Thus, reference should be made to the following claims, rather than to the foregoing specification, as indicating the scope of the invention.

What is claimed is:

1. A computer-readable storage medium for managing end-to-end QoS (Quality of Service) policies in a communication network, the storage medium comprising computer instructions executed by a processor for:
    establishing a plurality of QoS domains between a plurality of packet switching technologies operating with disparate QoS policies, each QoS domain having an ingress and egress boundary;
    monitoring traffic metrics of packets received from one or more of the plurality of QoS domains among the plurality of packet switching technologies at an ingress boundary, wherein the traffic metrics comprise a QoS policy for each of the received packets, traffic conditions, and the SLA packet traffic constraints of said plurality of QoS domains at said ingress boundary;
    remapping the QoS policy for each of the received packets according to said traffic metrics by lowering a transmission priority of the QoS policy of a packet when traffic conditions are above average and below peak traffic conditions established by the SLA;
    transmitting the packets with remapped QoS policies; and
    restoring the QoS policy of each packet exchanged between the egress boundaries of the plurality of QoS domains for the plurality of packet switching technologies.

2. The storage medium of claim 1, wherein each QoS policy of the plurality of packet switching technologies is managed by a Service Level Agreement (SLA) establishing packet traffic constraints.

3. The storage medium of claim 2, wherein a portion of the communication network operates according to a Multi-Protocol Label Switching (MPLS) standard, and wherein the remapping step comprises computer instructions for coding an EXP field conforming to the MPLS standard with the remapped QoS policy for each packet destined to be transported by the portion of the communication network operating according to MPLS standard.

4. The storage medium of claim 3, further comprising the step of discarding packets when traffic conditions exceed the SLA packet traffic constraints.

5. The storage medium of claim 1, wherein the restoring step further comprises computer instructions for:
    monitoring traffic conditions of packets received from one or more of the plurality of QoS domains at an egress boundary;
    queuing the received packets according to traffic conditions and the QoS policy provided in the remapping step for each of the received packets;
    restoring the QoS policy of each packet according to the QoS policy prior to the remapping step; and
    transmitting the queued packets with the restored QoS policy.

6. The storage medium of claim 5, wherein the restoring step further comprises computer instructions for discarding packets with a low QoS transmission priority when traffic conditions exceed a queuing capacity of the storage medium.

7. The storage medium of claim 1, wherein the plurality of packet switching technologies conform to a MultiProtocol Label Switching (MPLS) standard, and wherein a portion of said packet switching technologies are coupled to at least one among a group of Internet switching services comprising an Asynchronous Transfer Mode Frame Relay (ATMFR), a Virtual Private Network (VPN), a Voice over Internet Protocol (VoIP), a Digital Subscriber Line (DSL), and Ethernet.

8. A provider edge for managing end-to-end QoS (Quality of Service) policies in a communication network, comprising:
    a packet router at the provider edge; and
    a processor for controlling operations of the packet router, wherein the processor is programmed to:
        establish a plurality of QoS domains between a plurality of packet switching technologies operating with disparate QoS policies, each QoS domain having an ingress and egress boundary;
        monitor traffic metrics of packets received from one or more of the plurality of QoS domains among the plurality of packet switching technologies at an ingress boundary, wherein the traffic metrics comprise a QoS policy for each of the received packets, traffic conditions, and the SLA packet traffic constraints of said plurality of QoS domains at said ingress boundary;
        remap the QoS policy for each of the received packets according to said traffic metrics by lowering a transmission priority of the QoS policy of a packet when traffic conditions are above average and below peak traffic conditions established by the SLA; and
        transmit the packets with remapped QoS policies.

9. The provider edge of claim 8, wherein each QoS policy of the plurality of packet switching technologies is managed by a Service Level Agreement (SLA) establishing packet traffic constraints.

10. The provider edge of claim 9, wherein a portion of the communication network operates according to a Multi-Protocol Label Switching (MPLS) standard, and wherein the remap step the processor is further programmed to code an EXP field conforming to the MPLS standard with the remapped QoS policy for each packet destined to be transported by the portion of the communication network operating according to MPLS standard.

11. The provider edge of claim 10, wherein the processor is further programmed to discard packets when traffic conditions exceed the SLA packet traffic constraints.

12. The provider edge of claim 8, wherein the restore step the processor is further programmed to:
   monitor traffic conditions of packets received from one or more of the plurality of QoS domains at an egress boundary;
   queue the received packets according to traffic conditions and the QoS policy provided in the remapping step for each of the received packets;
   restore the QoS policy of each packet according to the QoS policy prior to the remap step; and
   transmit the queued packets with the restored QoS policy.

13. The provider edge of claim 12, wherein the restoring step the processor is further programmed to discard packets with a low QoS transmission priority when traffic conditions exceed a queuing capacity of the storage medium.

14. The provider edge of claim 8, wherein the plurality of packet switching technologies conform to a MultiProtocol Label Switching (MPLS) standard, and wherein a portion of said packet switching technologies are coupled to at least one among a group of Internet switching services comprising an Asynchronous Transfer Mode Frame Relay (ATMFR), a Virtual Private Network (VPN), a Voice over Internet Protocol (VoIP), a Digital Subscriber Line (DSL), and Ethernet.

15. A method for managing end-to-end QoS (Quality of Service) policies, comprising:
   establishing a plurality of QoS domains between a plurality of packet switching technologies operating with disparate QoS policies, each QoS domain having an ingress and egress boundary;
   monitoring traffic metrics of packets received from one or more of the plurality of QoS domains among the plurality of packet switching technologies at an ingress boundary, wherein the traffic metrics comprise a QoS policy for each of the received packets, traffic conditions, and the SLA packet traffic constraints of said plurality of QoS domains at said ingress boundary;
   remapping the QoS policy for each of the received packets according to said traffic metrics by lowering a transmission priority of the QoS policy of a packet when traffic conditions are above average and below peak traffic conditions established by the SLA;
   transmitting the packets with remapped QoS policies;
   monitoring traffic conditions of packets received from one or more of the plurality of QoS domains at an egress boundary;
   queuing the received packets according to traffic conditions and the QoS policy provided in the remapping step for each of the received packets;
   restoring the QoS policy of each packet exchanged between the egress boundaries of the plurality of QoS domains for the plurality of packet switching technologies; and
   transmitting each of the queued packets with their restored QoS policy.

16. The method of claim 15, wherein each QoS policy of the plurality of packet switching technologies is managed by a Service Level Agreement (SLA) establishing packet traffic constraints, and wherein the remapping step comprises the steps of:
   monitoring traffic metrics of packets received from one or more of the plurality of QoS domains at an ingress boundary, wherein said traffic metrics comprise a QoS policy for each of the received packets, traffic conditions, and the SLA packet traffic constraints of said plurality of QoS domains at said ingress boundary;
   discarding packets received when traffic conditions exceed the SLA packet traffic constraints;
   remapping the QoS policy for each of the remaining packets according to the traffic metrics; and
   transmitting the packets with remapped QoS policies.

17. The method of claim 15, wherein the method operates in a communication network, wherein a portion of the communication network operates according to a Multi-Protocol Label Switching (MPLS) standard, and wherein the remapping step further comprises the step of coding an EXP field conforming to the MPLS standard with the remapped QoS policy for each packet destined to be transported by the portion of the communication network operating according to MPLS standard.

* * * * *